US007130262B1

(12) United States Patent
Cortez et al.

(10) Patent No.: US 7,130,262 B1
(45) Date of Patent: Oct. 31, 2006

(54) METHOD AND APPARATUS FOR PROVIDING ALTERNATIVE LINK WEIGHTS FOR FAILED NETWORK PATHS

(75) Inventors: Bruce Gilbert Cortez, Marlboro, NJ (US); Sanja Durinovic-Johri, Aberdeen, NJ (US); Pravin Kumar Johri, Aberdeen, NJ (US)

(73) Assignee: AT & T Corp., Bedminster, NJ (US)

( * ) Notice: Subject to any disclaimer, the term of this patent is extended or adjusted under 35 U.S.C. 154(b) by 1032 days.

(21) Appl. No.: 10/047,969

(22) Filed: Jan. 16, 2002

(51) Int. Cl.
*H04L 1/00* (2006.01)
(52) U.S. Cl. ............... 370/216; 370/252; 370/238
(58) Field of Classification Search .............. None
See application file for complete search history.

(56) References Cited

U.S. PATENT DOCUMENTS 5,754,543 A * 5/1998 Seid ..................... 370/256
6,141,319 A * 10/2000 Dighe et al. ............. 370/218
6,301,244 B1 * 10/2001 Huang et al. ............ 370/238
6,847,607 B1 * 1/2005 Kasdan ................... 370/225

OTHER PUBLICATIONS

J. J. Shi, Analysis and design of survivable telecommunication networks, Oct. 1997, IEEE, vol. 144 and pp. 322-330.*

* cited by examiner

*Primary Examiner*—Steven Nguyen

(57) ABSTRACT

A data network wherein network links have an assigned service weight and a restoration weight that are used as factors for respectively determining an optimum primary data path and a back-up data path through the network. The restoration path is used in the event of a failure of the primary service path and a Dijkstra or similar algorithm may be used for determining these paths. Service weights may be assigned to the links to prioritize finding the shortest possible path, whereas restoration weights may be assigned to the links to find a path with the maximum available capacity.

2 Claims, 8 Drawing Sheets

METHOD AND APPARATUS FOR PROVIDING ALTERNATIVE LINK WEIGHTS FOR FAILED NETWORK PATHS

BACKGROUND

The present invention relates to circuit-switched networks, but more specifically to a method and an apparatus for determining paths for data packets or synchronous optical network/synchronous digital hierarchy ("SONET/SDH") connections in a network during link failures.

While the disclosure sets forth an embodiment of the invention with respect to transmission of data packets, it also applies to SONET/SDH circuits as well.

Data networks, such as asynchronous transfer mode ("ATM"), frame relay ("FR"), public-switched telephone networks ("PSTN"), optical cross-connect ("OXC"), packet layer ("PL"), and IP multiprotocol label switching ("IP/MPLS") include nodes connected by links. There could be multiple links between a pair of nodes in a network. A typical node controller implements open shortest path first ("OSPF"), multiprotocol label switching ("MPLS"), private network node interface ("PNNI") or other routing and signaling protocols. Data packets transmitted in such networks travel between these nodes over the links. To determine a path through the network, a node controller uses an assigned weight associated with prospective links to determine a best or efficient path that will complete the circuit from a source node to a destination node. Weights may also be used to characterize a number of Quality of Service metrics associated with the link, which the controller may also assess in determining the desirability of a prospective path.

Based on these weighting factors, the node controller determines the appropriate service path, and also sends setup messages to provision all nodes in the path according to the type of information to be conveyed. In addition to determining a service path, the controller also determines a restoration path in the event of a subsequent link failure in the service path. In prior systems, both service and restoration paths were generally determined by first eliminating from consideration those links that do not meet the Quality of Service requirements, and then using the assigned weights of the remaining links in a Dijkstra-like algorithm to calculate a minimum weight path to a destination. The elimination of links that do not meet Quality of Service requirements can also be embedded inside the Dijkstra algorithm.

The Dijkstra algorithm identifies the path with the lowest weight based on link weighting factors when conveying information from an originating node to a destination node in the network. The link weighting factor is generally a static value assigned to each link and may represent any factor to determine an optimal path, including such factors as the length of the link, cost of the link, and bandwidth capacity of the link. One example of a commonly used link weighting factor is the inverse of the bandwidth. Because the Dijkstra algorithm chooses a path with the lowest weight, it will identify the path among many with the greatest bandwidth. The algorithm includes comparing link weight values of the links directly connecting the source node to adjacent nodes in the network. The link with the lowest weighting value is selected and stored as the optimal path between a source node to a corresponding adjacent node. The algorithm then repeats this process, comparing the weights among alternative paths for the remaining links at link junction with the sum of the link value chosen in the first step, and the links directly connecting the node chosen in the first step with any other nodes. The path with the lowest sum total weighting value is chosen as the optimal path for conveying the data packets to the destination node. The algorithm and solution continue to expand until the optimal path for the destination node is found. The node controller then sends setup messages to provision the nodes identified in the optimal path and sends the data packets over that path. Service paths are typically provisioned one at a time, whenever the requests arrive at the nodes.

In the event of a network failure, many circuits may be affected. The node controllers attempt to restore the circuits as quickly as possible to keep the service outage to a minimum. These circuits may originate in different nodes and may be restored simultaneously in a distributed fashion by many node controllers in the network independently of each other. The distributed restoration may become stale, e.g., out-of-date, relative to available capacity of other links after a network failure because a minimum amount of time is necessary for routing messages through the network to update the state of the network. Due to out-of-date information, the path chosen for restoring a circuit may not work out. As the node controller attempts to set up the circuit along the path, it may find that a link in the path no longer has available capacity because the capacity was assigned to other circuits that just restored. The setup message for the circuit then cranks back to the node controller. The node controller will eliminate this link from consideration and calculate a new path. There is a need to minimize the number of crankbacks as these prolong the time it takes to restore the circuit. The smaller the amount of available capacity in a link, the higher the likelihood of a crankback. Thus, there is a need to determine different paths for the service path and the restoration path as this may lead to the maximum available capacity for restoration. During restoration, the node controller may need to identify paths for many failed circuits in a very short time. The path need not be the shortest possible path because it only needs to be used until the network failure is repaired and the restored circuits routed back to their original service paths. When determining the original service path, the node controllers must prioritize finding the shortest possible path; however, there is no constraint on this time period. An alternative procedure used in the art is for the controller to pre-calculate a prospective restoration path for a circuit, store it, and use it first when the circuit fails. If the setup message cranks back on this path, then the Dijkstra algorithm is used to obtain a new path.

In view of the foregoing, the present invention addresses the need for different path calculations for service provisioning and restoration by assigning each link at least two different weights, one being used to calculate the service path and the other being used to calculate the restoration path.

SUMMARY OF THE INVENTION

In accordance with the invention, a method of determining the path of data between nodes in a circuit-switched network comprises assigning to a network link a first weight and a second weight, determining a service path using the first link weight, and determining a restoration path using the second weight.

In accordance with another aspect of the invention, an apparatus for determining service and restoration paths in a network includes a controller that determines a service path using a first weight and that determines a restoration path using a second weight.

In accordance with yet another aspect of this invention, routing and signaling protocols distribute information relative to the second weight throughout the network, just as they distribute information relative to the first weight.

Advantages provided by the invention include increased network efficiency and increased network speed due to the calculation of different paths for service and restoration.

Other features, advantages, and aspects of this invention will become apparent upon review of the succeeding description taken in connection with the accompanying drawings. The invention, though, is pointed out with particularity by the appended claims.

DESCRIPTION OF ILLUSTRATIVE EMBODIMENTS

Figure 1:
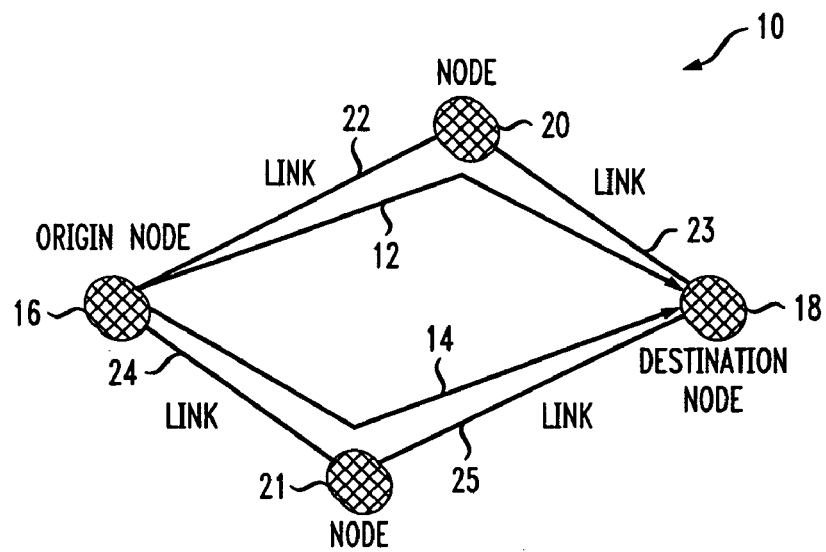
FIG. 1 depicts a simplified circuit-switched data network that includes two possible paths for data packets to get from an originating node to a destination node.

FIG. 1 depicts a simplified data network 10 that includes two possible paths 12 and 14 for data packets to travel from the originating node 16 to the destination node 18. In larger networks there are, of course, many more possible path choices. Network 10 is representative of a larger network, or may be considered a small part of a large network. As seen, network 10 includes nodes 16, 18, 20, 21 that are connected by network links 22, 23, 24, 25. In the illustrated embodiment, network 10, however, does not include a direct link between an originating node 16 and a destination node 18, so a controller in node 16 thereof must choose one of the existing paths 12 or 14 which pass the nodes 20 and 21, respectively, so that the data packets arrive at the destination node 18 via one of the nodes 20 or 21. Accordingly, the controller of node 16 must calculate an optimal path once during service provisioning and the controller must again calculate the path in the case of a network failure that affects this data circuit.

Figure 2:
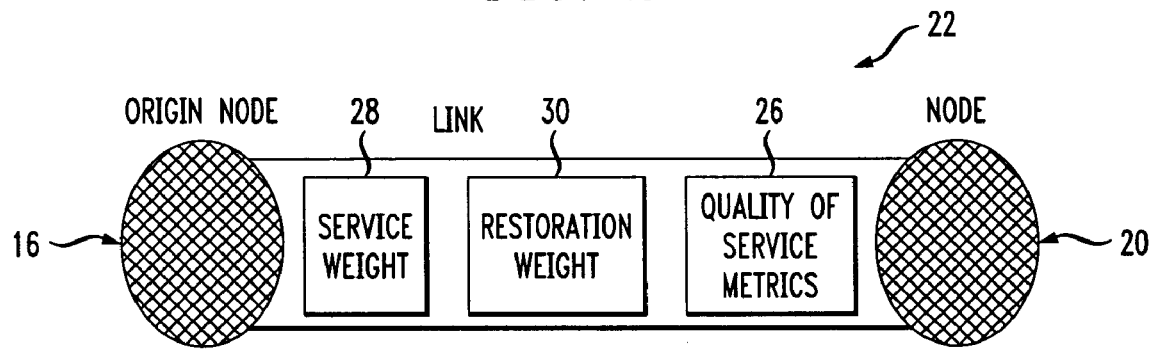
FIG. 2 shows a network link from a circuit-switched data network, and the information stored on the network link.

FIG. 2 shows a network link 22 in a circuit-switched data network 10 according to an embodiment of the present invention, as well as the type of information stored for that link. Link 22 connects originating node 16 with another node 20, and is also representative of the other links 23, 24, and 25 illustrated in FIG. 1. Link 22 is representative of the links of a larger network connecting any two nodes and stores information, such as quality of service requirements like minimum delay and available bandwidth, used by a node controller to determine the optimal path. In order to fulfill the quality of service requirements, link 22 has a corresponding quality of service metrics 26 to permit the node controller to determine whether the link has sufficient resources available for conveying the desired information. If the quality-of-service metrics 26 of link 22 do not meet the quality of service requirements for the data transfer, the controller of node 16 eliminates the link 22 from consideration for optimal path determination.

Link 22 also has an assigned service weight 28 and a restoration weight 30. In order to send data packets from originating node 16, the controller in node 16 determines an optimal path for the packets and sends setup messages to provision the selected nodes needed for the path. The controller uses the service weight 28 that is assigned to each link for calculations in the Dijkstra algorithm or a similar algorithm as known in the art to determine the optimal path. The service weight 28 may be an assigned value that prioritizes finding the shortest possible path between the originating node 16 and the destination node 18. In the event of a network failure, the controller uses the restoration weight 30 that is assigned to the links in calculations in the Dijkstra algorithm or a similar algorithm as known in the art to determine the optimal path to be used for restoration. The restoration weight 30 may be an assigned value that prioritizes finding a path with the maximum available capacity, for example, instead of finding the shortest possible path.

Figure 3A:
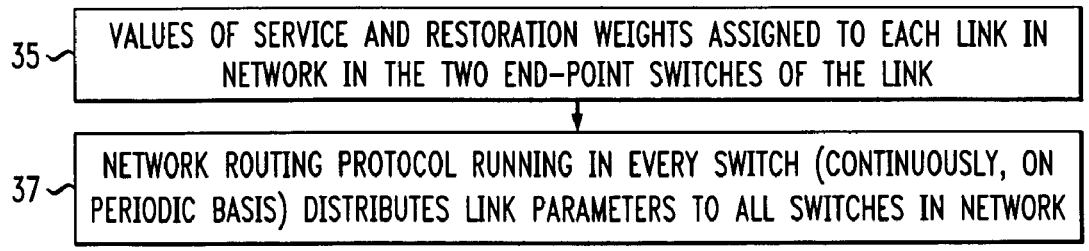
FIGS. 3A through 3C illustrate the process for determining an optimal path in a network using different link weights for service and restoration paths in accordance with one embodiment of the present invention.

FIG. 3A illustrates the process of assigning restoration and service weights to links and then distributing this information via a routing and signaling protocol to other nodes in the network. It shows a step 35 where the weights are provisioned link by link in the network. The values of the restoration and service weights, along with any other quality of service metrics, need to be provisioned in the two end nodes of every link. The assignment of weights may be determined by network engineers at the time of network deployment, may be statically set during network operation, or may be dynamically altered during network operation. The value of the service weight 28 prioritizes finding the shortest possible path for the originating node 16 to the destination node 18, whereas the value for the restoration weight 30 prioritizes finding a path with maximum available capacity. Other priorities may be used as well. In a preferred embodiment, all nodes in a data network run one or more routing and signaling protocols. These protocols use link-state advertisements to distribute link attributes to all nodes in the network as indicated by step 37. The protocols need to be enhanced to carry information of the second weight in its link-state advertisements, just as information of the first weight is carried. This invention will work with a suitable modification to any protocol known in the art.

Figure 3B:
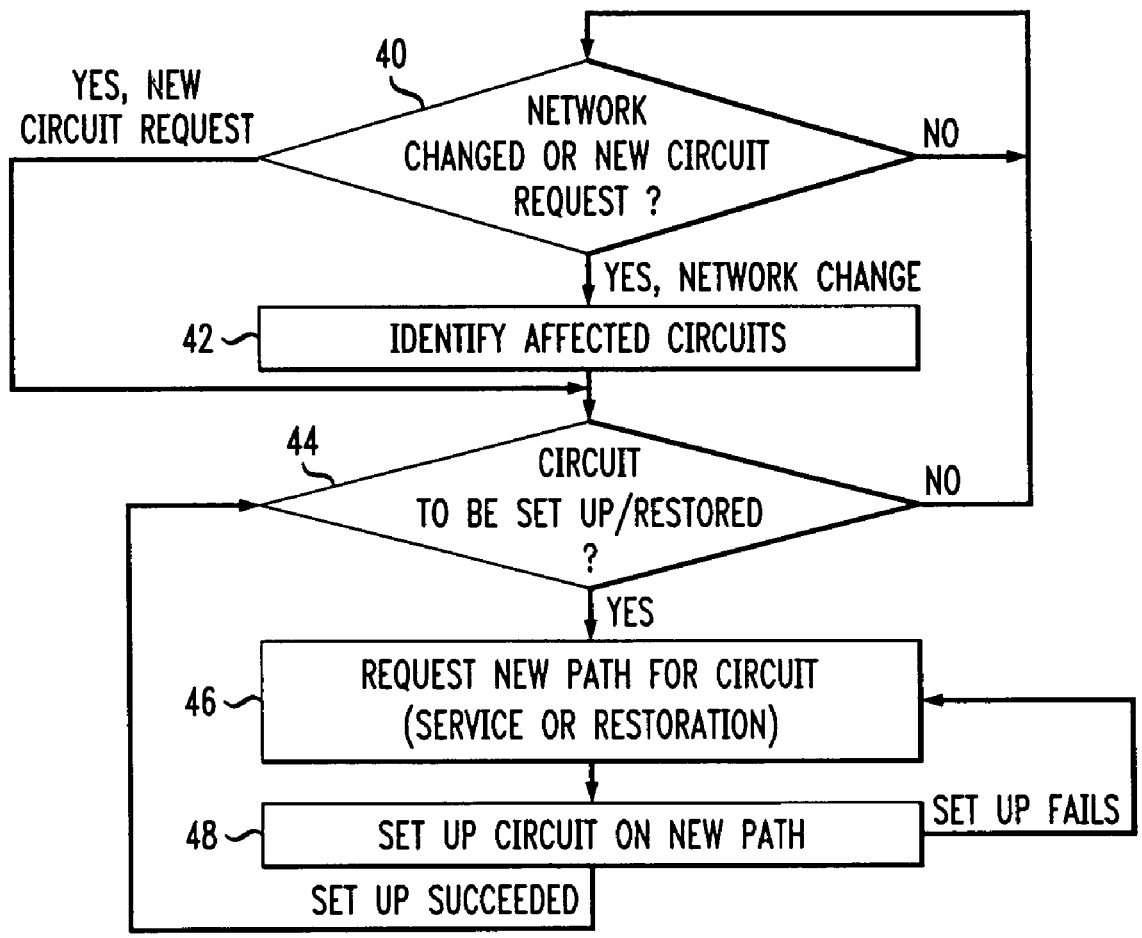

FIG. 3B illustrates how circuit-switched data networks handle requests for setting up a circuit. The node controllers using routing and signaling protocols continuously monitor the network as shown in step 40. A change in the network such as a link failure may cause some of the existing circuits that use this link to also fail. The nodes adjacent to the failure need to identify the circuits affected by the failure and then convey this information to the nodes that originated the affected circuits. Routing and signaling protocols, known in the art, are used for this task. The node controller in a node gets the information pertaining to the failed circuits and identifies the circuits it needs to restore, as shown in step 42. Alternatively, there could be a request by a network administrator to provision one or more new circuits. This is also shown in step 40. The need to restore circuits and the need to provision new circuits cause the node controller to enter step 44. The process includes determining a service (or restoration) path for these circuits, as shown in step 46, and then to attempt and set up (or restore) the circuit along the path selected, as shown in step 48. Step 48 can fail with a crankback, as described before, and leads to a request for a new path. How the path is calculated in step 46 will be described in detail in the FIG. 3C.

Figure 3C:
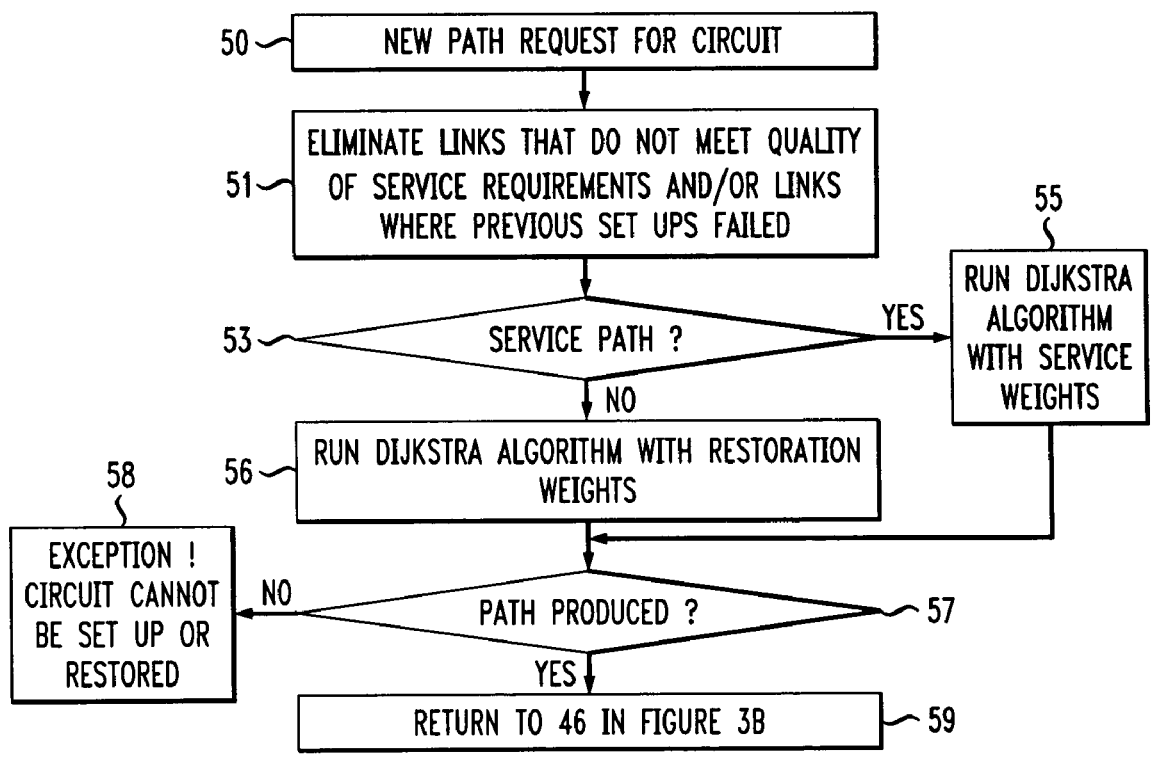

FIG. 3C shows a step 50 where the request for a new path has been received for a circuit. Based on the quality of service metrics of this circuit and on information from previous crankbacks by this circuit, the node controller eliminates all links that are not suitable for the path. It then determines if a service or restoration path is desired in step 53, and then runs the Dijkstra or a similar algorithm with the appropriate service or restoration weight, in steps 55 and 56 respectively, to determine the path. If the Dijkstra algorithm is able to produce a path, then this path is used in step 46. On the other hand, if the Dijkstra algorithm fails to produce a path, then an exception condition is created as shown in step 58. This invention will work with any exception handling mechanism known in the art.

Figure 4A:
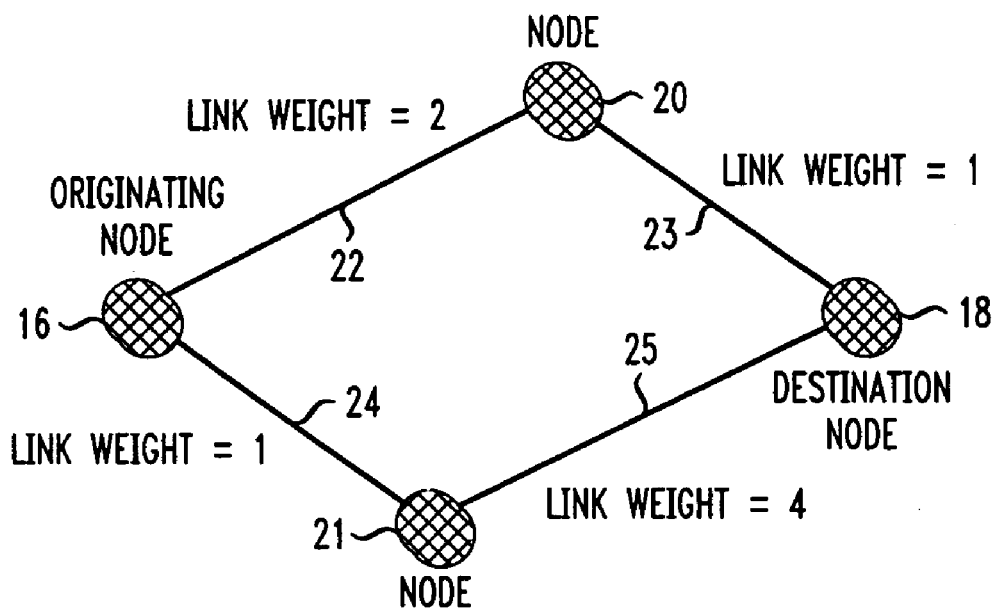
FIGS. 4A through 4E illustrate a Dijkstra algorithm that uses service weights in order to determine an optimal service path for the simplified circuit-switched network depicted in FIG. 1.

FIGS. 4A through 4E illustrate the Dijkstra algorithm using a service weight 28 in order to determine an optimal service path for the simplified circuit-switched network 10 depicted in FIG. 1. The weights assigned are purely demonstrative and may represent any weighting factor used in the art. FIG. 4A shows the network 10 with a service weight 28 assigned to each link 22, 23, 24, and 25. Link 22 connecting the originating node 16 with the adjacent node 20 has a weight of 2, for example, and link 24 connecting the originating node 16 with the adjacent node 21 has a weight of 1. Link 23 connecting node 20 with the destination node 18 has a weight of 1 and the link connecting node 21 with the destination node 18 has a weight of 4.

Figure 4B:
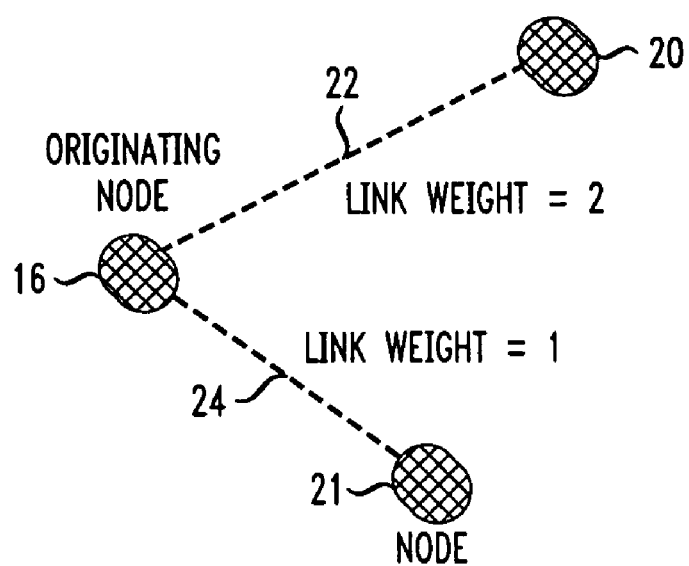

FIG. 4B illustrates a first step in the determination of the optimal path using the Dijkstra algorithm. The algorithm starts by comparing the weight values 28 for the links 22 and 24 directly connected to the originating node 16. The dotted lines representing links 22 and 24 show that they are under consideration, but not yet chosen by the controller as being optimal. The weight of link 22 is 2 and the weight of link 24 is 1. The algorithm implemented by the controller chooses the path with the lowest weight.

Figure 4C:
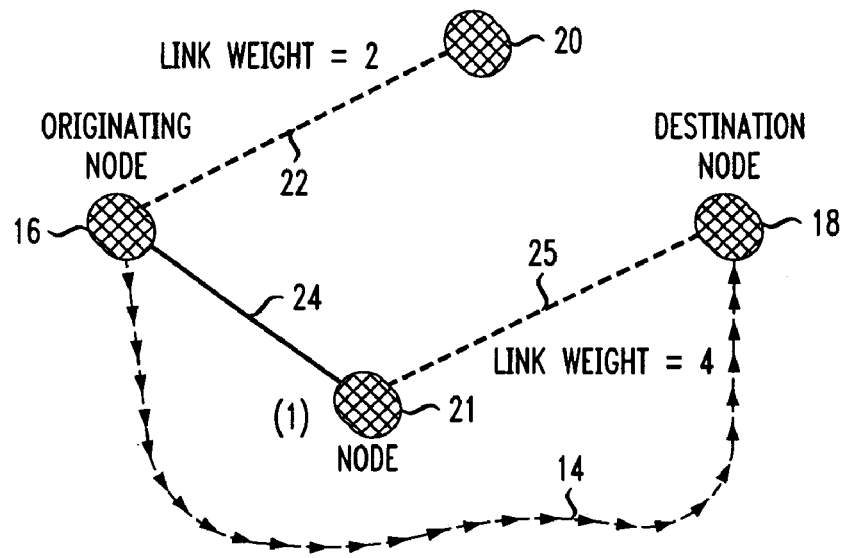

FIG. 4C shows that link 24 is chosen by the algorithm because the weight value of link 24 is less than that of link 22. This choice is shown by the solid line representing link 24. The number in parentheses by the node 21 connected via the chosen link 24 shows that the optimal path from the originating node 16 to the chosen node 21 has a weight value of 1. The dotted lines show the algorithm compares the path from the originating node 16 to adjacent node 20, with a weight value of 2, to the path 14 from the originating node 16 to the destination node 18 via node 21, with a weight value of 5 (weight value of link 24 plus the weight value of link 25).

Figure 4D:
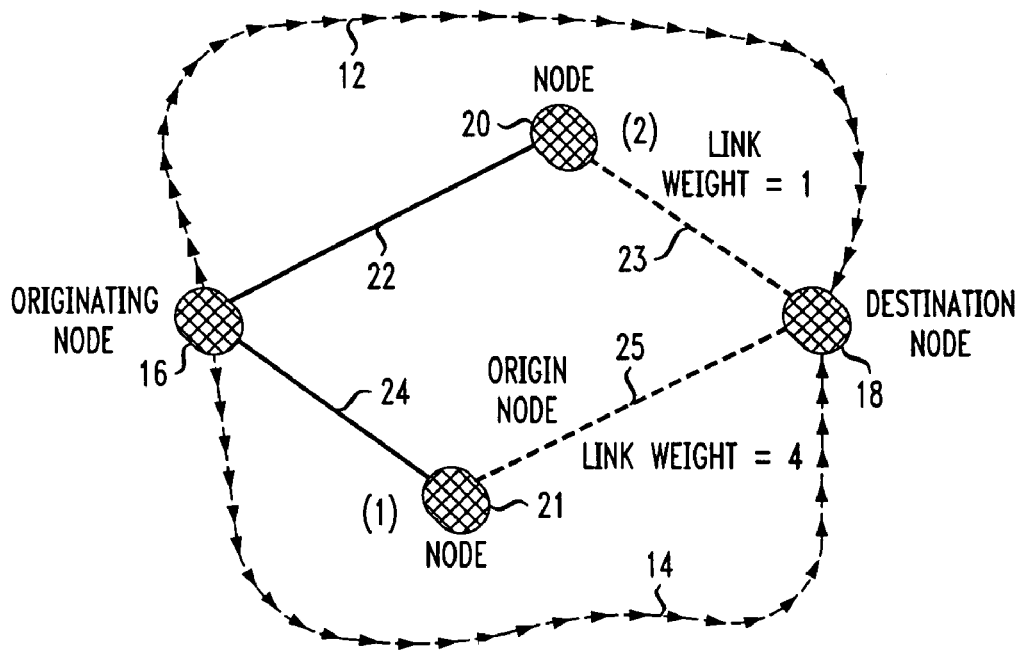

FIG. 4D shows that link 22 is chosen because the weight value of link 24 is less than the weight value of path 14. The optimal path from the originating node 16 to node 20 has a weight value of 2. The algorithm now compares path 12, with a weight value of 3 to path 14 with a weight value of 5.

Figure 4E:
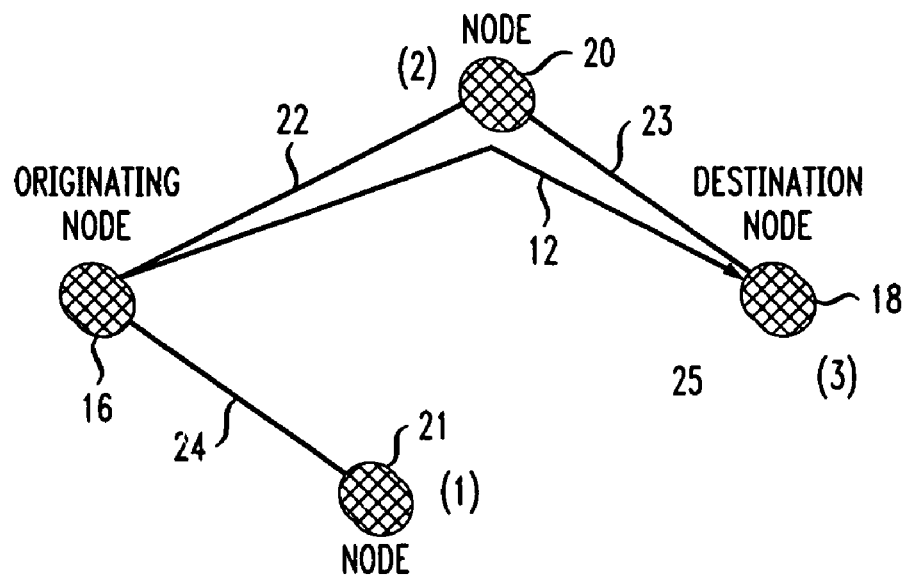

FIG. 4E shows the optimal path determined by the Dijkstra algorithm. Path 12 is chosen because the weight value of path 12 is less than that of path 14. The optimal path 12 from the originating node 16 to the destination node 18 has a weight value of 3 and goes through node 20 via the links 22 and 23.

FIG. 5 illustrates the Dijkstra algorithm using the restoration weight 30 in order to determine an optimal restoration path for the simplified circuit-switched network 10 depicted in FIG. 1. The weights assigned are purely demonstrative and may represent any weighting factor used in the art. The restoration weights 30 may be assigned to represent a different factor than the service weights 28. FIG. 5A shows the network 10 with a restoration weight 30 assigned to each link 22, 23, 24, and 25. Link 22 connecting the originating node 16 with the adjacent node 20 has a weight of 6 and the link 24 connecting the originating node 16 with the adjacent node 21 has a weight of 3. Link 23 connecting node 20 with the destination node 18 has a weight of 4 and the link connecting node 21 with the destination node 18 has a weight of 5.

Figure 5A:
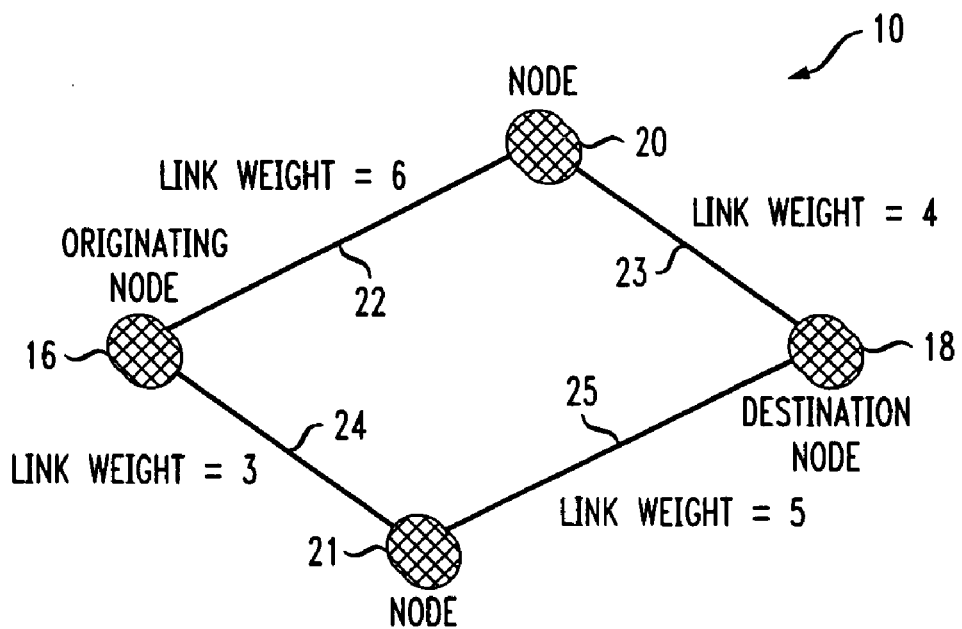
FIGS. 5A through 5E illustrate a Dijkstra algorithm that uses restoration weights in order to determine an optimal restoration path for the simplified circuit-switched network depicted in FIG. 1.
Figure 5B:
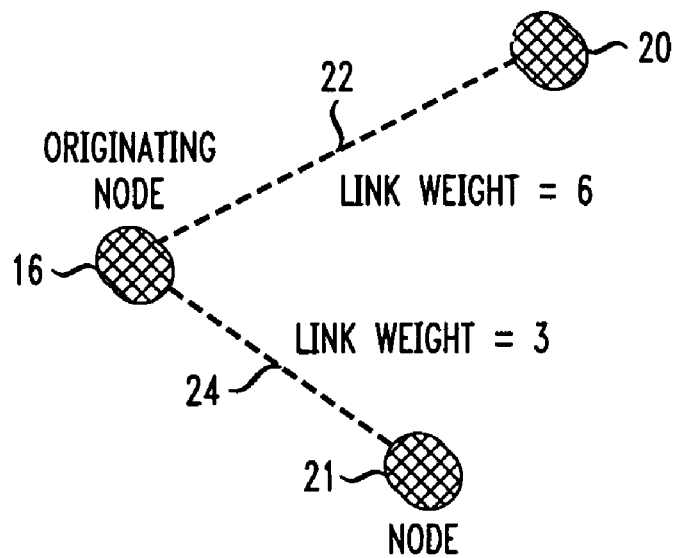

FIG. 5B shows a first step in the determination of the optimal path using the Dijkstra algorithm. The algorithm starts by comparing the weight values 30 for the links 22 and 24 directly connected to the originating node 16. The dotted lines representing the links 22 and 24 show that they are under consideration, but not yet chosen as optimal. The weight of link 22 is 6 and the weight of link 24 is 3. The algorithm chooses the path with the lowest weight.

Figure 5C:
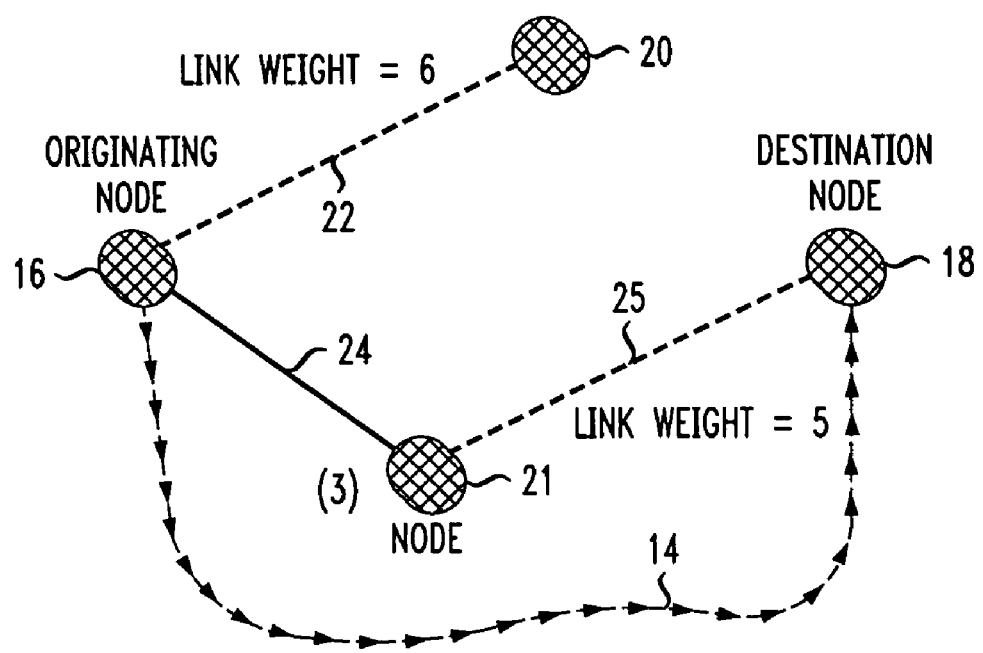

FIG. 5C shows that link 24 is chosen by the algorithm because the weight value of link 24 is less than that of link 22. This choice is shown by the solid line representing link 24. The number in parentheses by the node 21 connected via the chosen link 24 shows that the optimal path from the originating node 16 to the chosen node 21 has a weight value of 3. The dotted lines show the algorithm compares the path from the originating node 16 to adjacent node 20, with a weight value of 6, to the path 14 from the originating node 16 to the destination node 18 via node 21, with a weight value of 8 (weight value of link 24 plus the weight value of link 25).

Figure 5D:
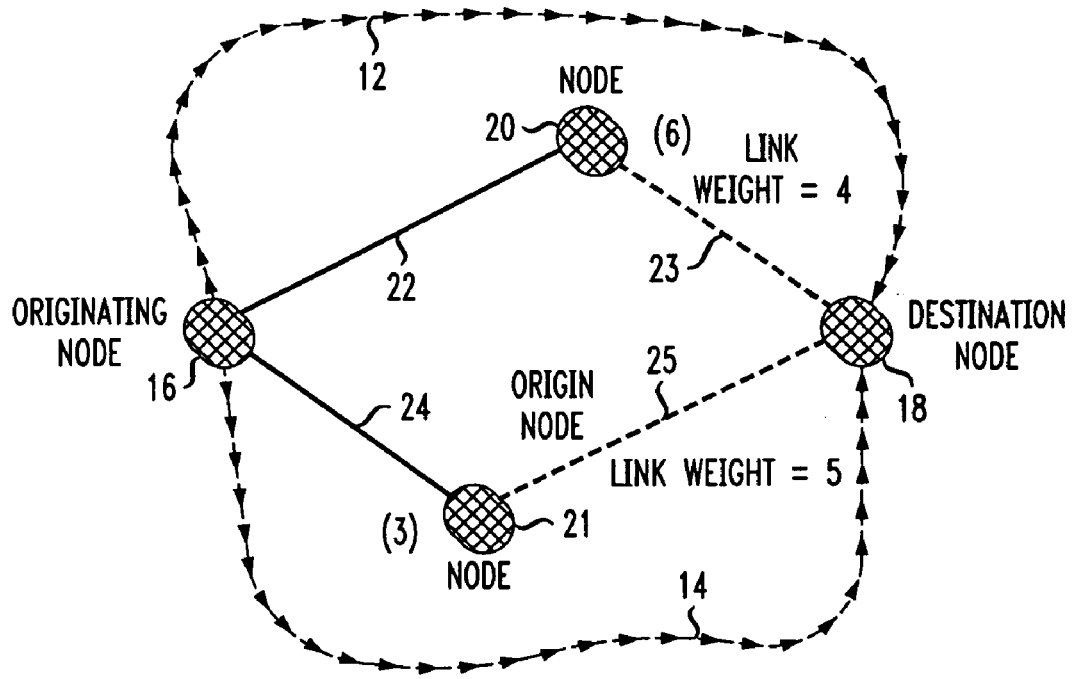

FIG. 5D shows that link 22 is chosen because the weight value of link 24 is less than the weight value of path 14. The optimal path from the originating node 16 to node 20 has a weight value of 6. The algorithm now compares path 12, with a weight value of 10 to path 14 with a weight value of 8.

Figure 5E:
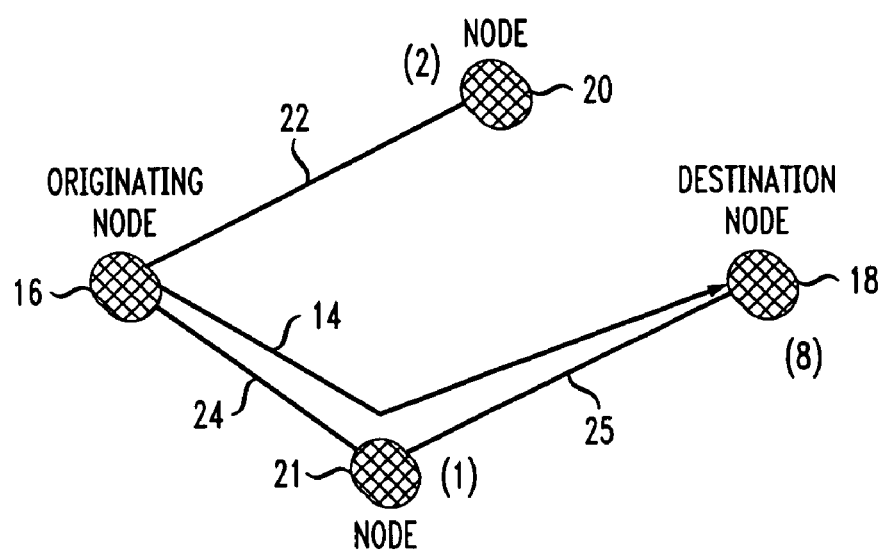

FIG. 5E shows the optimal path determined by the Dijkstra algorithm. Path 14 is chosen because the weight value of path 14 is less than that of path 12. The optimal path 14 from the originating node 16 to the destination node 18 has a weight value of 8 and goes through node 21 via the links 24 and 25. Because the restoration weights 30 were assigned different values than the service weights 28, a different solution is found than that in FIG. 4E.

Based on the above illustrations and description, it is apparent that modifications, extensions, and variations of the illustrative embodiments may readily come to those skilled in the art. Although the disclosed embodiment is directed to packet data networks, the invention has applicability to information networks generally. As such, the invention is defined by the appended claims rather than by the illustrative embodiments.

Accordingly, we claim:

1. In a data network, a method of determining a path of data conveyed on links between nodes of the network, comprising:
   assigning to a network link a service weight and a restoration weight;
   determining a service path of at least one link using the service weight;
   determining a restoration path of at least one link using the restoration weight; and transmitting the data in the network on at least one of the service and restoration paths, wherein in said determining step of said service path, said service weight is assigned to each link to prioritize finding a shortest possible service path, and wherein in said determining step of said restoration path, said restoration weight is assigned to each link to find a restoration path with a maximum available capacity.

2. A method of determining a path of a connection between at least two nodes in a SONET/SDH network, comprising:

assigning to a network link a service weight and a restoration weight;

determining a service path of at least one link using the service weight;

determining a restoration path of at least one link using the restoration weight; and transmitting information in the network on at least one of the service and restoration paths, wherein in said determining step of said service path, said service weight is assigned to each link to prioritize finding a shortest possible service path, and wherein in said determining step of said restoration path, said restoration weight is assigned to each link to find a restoration path with a maximum available capacity.

* * * * *